United States Patent
Beier et al.

(10) Patent No.: US 11,397,718 B2
(45) Date of Patent: Jul. 26, 2022

(54) DYNAMIC SELECTION OF SYNCHRONIZATION UPDATE PATH

(71) Applicant: International Business Machines Corporation, Armonk, NY (US)

(72) Inventors: Felix Beier, Haigerloch (DE); Sabine Perathoner-Tschaffler, Nufringen (DE); Dennis Butterstein, Stuttgart (DE); Einar Lueck, Filderstadt (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/016,314

(22) Filed: Sep. 9, 2020

(65) Prior Publication Data
US 2022/0075770 A1    Mar. 10, 2022

(51) Int. Cl.
*G06F 16/23*    (2019.01)
*G06F 11/34*    (2006.01)
(Continued)

(52) U.S. Cl.
CPC ...... *G06F 16/2358* (2019.01); *G06F 11/3409* (2013.01); *G06F 16/217* (2019.01);
(Continued)

(58) Field of Classification Search
CPC ............ G06F 16/2358; G06F 11/3409; G06F 16/217; G06F 16/2282; G06F 16/2322; G06F 16/235
See application file for complete search history.

(56) References Cited

U.S. PATENT DOCUMENTS 6,029,178 A    2/2000    Martin
8,527,478 B1 *    9/2013    Goldman .............. G06F 16/29
            707/695
(Continued)

FOREIGN PATENT DOCUMENTS

CN    106294713 A    1/2017

OTHER PUBLICATIONS

"Dmrefresh—Refresh subscription," IBM, accessed Aug. 25, 2020, 2 pages. <https://www.ibm.com/support/knowledgecenter/en/SSTRGZ_11.4.0/com.ibm.cdcdoc.mysql.doc/refs/dmrefresh.html>.
(Continued)

*Primary Examiner* — Dangelino N Gortayo
(74) *Attorney, Agent, or Firm* — Mark Bergner

(57) ABSTRACT

A method comprises receiving a stream of change log records from a source database system; generating change statistics based on a number of pending changes per table partition according to the change log records; estimating, based on performance statistics, a first amount of time for applying the pending changes to a target database system using an incremental update path; estimating, based on the performance statistics, a second amount of time for applying the pending changes to the target database using a bulk update path; dynamically selecting, based on comparison of the first amount of time with the second amount of time, one of the incremental update path and the bulk update path for applying the pending changes to the target database system; and applying the pending changes to the target database system using the selected update path.

20 Claims, 6 Drawing Sheets

(51) Int. Cl.
*G06F 16/21* (2019.01)
*G06F 16/22* (2019.01)

(52) U.S. Cl.
CPC ........ *G06F 16/2282* (2019.01); *G06F 16/235* (2019.01); *G06F 16/2322* (2019.01)

(56) References Cited

U.S. PATENT DOCUMENTS

| | | | |
|---|---|---|---|
| 8,996,458 | B2 | 3/2015 | Shang |
| 9,442,995 | B2 | 9/2016 | Pareek |
| 9,558,211 | B1* | 1/2017 | Danaher ............ G06F 16/2365 |
| 9,659,077 | B2 | 5/2017 | Chen |
| 10,275,507 | B2 | 4/2019 | Hrle |
| 10,540,346 | B2 | 1/2020 | Martin |
| 10,657,128 | B2 | 5/2020 | Beier |
| 10,698,883 | B2 | 6/2020 | Beier |
| 10,706,073 | B1* | 7/2020 | Tamkin ................ G06F 16/278 |
| 10,754,844 | B1* | 8/2020 | Jain ..................... G06F 16/2358 |
| 10,929,428 | B1 | 2/2021 | Brahmadesam |
| 2005/0193024 | A1 | 9/2005 | Beyer |
| 2007/0112882 | A1 | 5/2007 | Tysowski |
| 2009/0319550 | A1* | 12/2009 | Shau .................... G06F 16/284 |
| 2011/0153568 | A1 | 6/2011 | Shang |
| 2013/0159249 | A1 | 6/2013 | Dewall |
| 2014/0365520 | A1* | 12/2014 | Pujare .................... H04L 51/36 707/769 |
| 2015/0379061 | A1* | 12/2015 | Paraschivescu .... G06F 16/2329 707/695 |
| 2017/0060695 | A1 | 3/2017 | Clare |
| 2020/0034365 | A1* | 1/2020 | Martin ................ G06F 16/2358 |

OTHER PUBLICATIONS

Ballard et al., "Smarter Business Dynamic Information with IBM InfoSphere Data Replication CDC," IBM, Mar. 2012, 484 pages. <http://www.redbooks.ibm.com/redbooks/pdrs/sg247941.pdf>.

Mell et al., "The NIST Definition of Cloud Computing," Recommendations of the National Institute of Standards and Technology, U.S. Department of Commerce, Special Publication 800-145, Sep. 2011, 7 pages.

Saleem, "Cost Optimization for Data Placement Strategies in an Analytical Cloud Service," University of Stuttgart, Oct. 17, 2016, 106 pages. <https://elib.uni-stuttgart.de/bitstream/11682/9824/1/main-report.pdf>.

Stolze et al., "Autonomous Data Ingestion Tuning in Data Warehouse Accelerators," Datenbanksysteme für Business, Technologie und Web (BTW 2017), Mar. 2017, 11 pages. <http://btw2017.informatik.uni-stuttgart.de/slidesandpapers/H2-12-48/paper_web.pdf>.

Stolze et al., "Partial Reload of Incrementally Updated Tables in Analytic Database Accelerators," Datenbanksysteme für Business, Technologie und Web (BTW 2019), Mar. 8, 2019, 11 pages. <https://btw.informatik.uni-rostock.de/download/tagungsband/C7-2.pdf>.

Beier et al., "Data Synchronization in a Data Analysis System," U.S. Appl. No. 17/097,848, filed Nov. 13, 2020.

List of IBM Patents or Patent Applications Treated as Related, Nov. 13, 2020, 2 pages.

* cited by examiner

DYNAMIC SELECTION OF SYNCHRONIZATION UPDATE PATH

BACKGROUND

Current database replication products typically include a source database system and a target database system. The source database system is the data source of the replication product. The database state is continuously changed by insert/update/delete operations. These modifying operations are recorded in both the database state and a recovery log. The recovery log is used to backup the database state transitions allowing the system to be restored to the exact database state by replaying the log records. The target database system is the target for data fetched form the source by the replication product.

SUMMARY

Aspects of the disclosure may include a method, computer program product, and system. One example of the method comprises receiving a stream of change log records from a source database system; generating change statistics based on a number of pending changes per table partition according to the change log records; estimating, based on performance statistics, a first amount of time for applying the pending changes to a target database system using an incremental update path; estimating, based on the performance statistics, a second amount of time for applying the pending changes to the target database using a bulk update path; dynamically selecting, based on comparison of the first amount of time with the second amount of time, one of the incremental update path and the bulk update path for applying the pending changes to the target database system; and applying the pending changes to the target database system using the selected update path.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
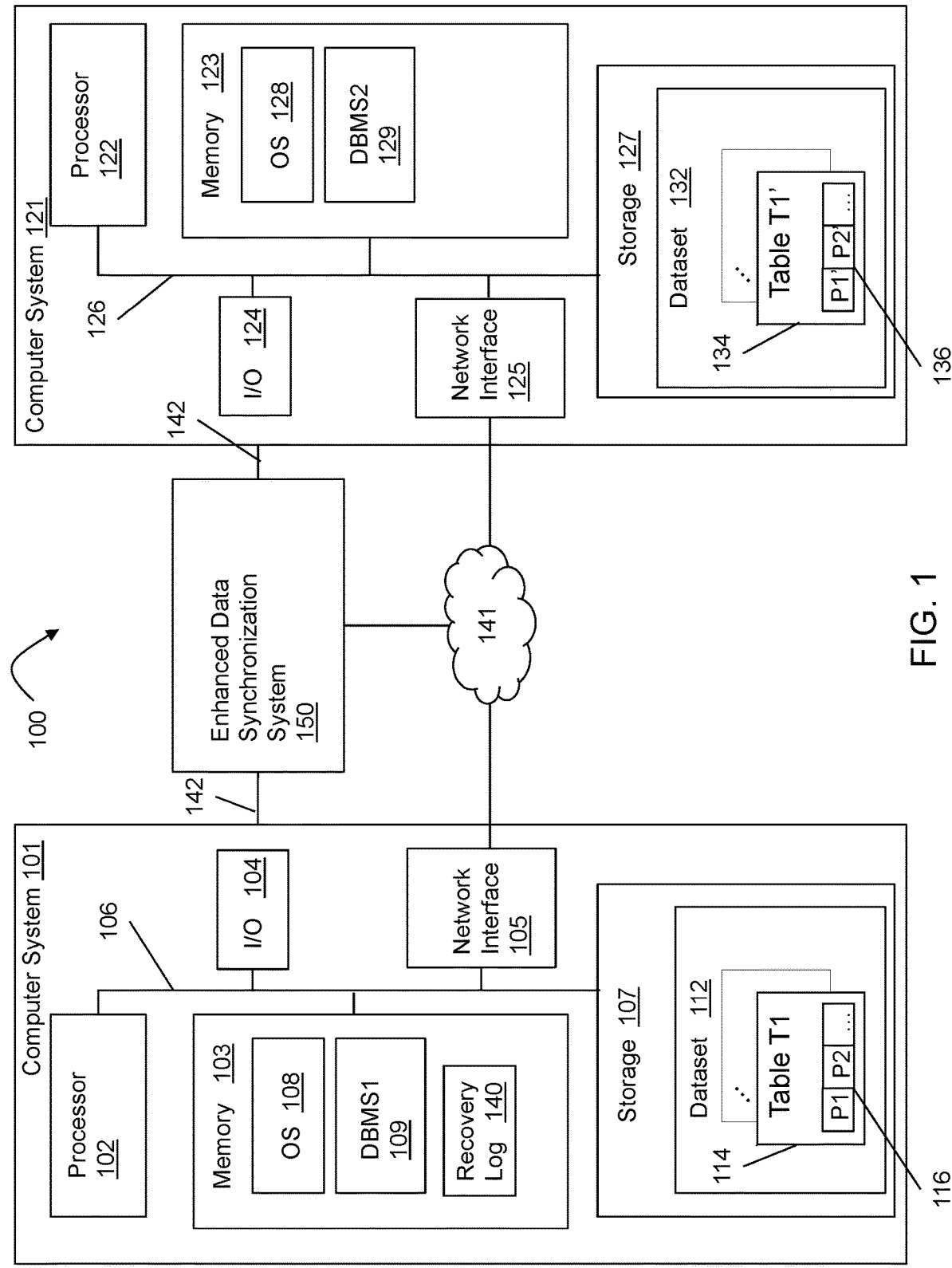
FIG. 1 is a block diagram of one embodiment of an example data processing system in which the enhanced data synchronization system can operate.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, "a number of" when used with reference items, means one or more items. For example, "a number of different types of networks" is one or more different types of networks.

Further, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. Additionally, the amount or number of each item in a combination of the listed items need not be the same. For example, in some illustrative examples, "at least one of A, B, and C" may be, for example, without limitation, two of item A; one of item B; and ten of item C; or 0 of item A; four of item B and seven of item C; or other suitable combinations.

Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Furthermore, the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Database replication systems typically include a source database system and a target database system. The source database system includes the data source of the replication system. The database state is continuously changed by operations on the data, such as insert operations, update operations, and delete operations. These modifying operations are recorded in both the database state and a recovery log. The purpose of the recovery log is to backup database state transitions which enables restoring the database state by replaying the log records. The target database system includes the target database for data retrieved from the source database by the database replication system.

Typically, there are two approaches or paths for data synchronization between the source database and the target database. The first is referred to as an incremental or continuous update path. In the incremental update path, a log reader reads log records from the source database system's recovery log and extracts relevant modification information regarding modification operations (e.g. insert, update, and delete operations). The log reader transmits the extracted information to an apply component of the data synchronization system. Thus, only the records having changes are updated on the target database system using the incremental update path. The apply component can buffer log records received from the log reader and consolidates the changes into batches. Consolidating the changes into batches can improve efficiency when applying the modifications to the target database via a bulk-load interface. Although the transactional cost per row in the database is high, only the changed records are transferred. Thus, the impact on the source database is low for infrequent changes. The incremental update path, however, can cause performance issues if the data synchronization system is not able to keep up with the amount of modifications. That is, when operating in the incremental update path, latency can build up if the modifications surpass the replication speed.

The second approach for data synchronization is referred to as a bulk load update path or bulk update path. In the bulk load update path, either the data of an entire table or the data of a set of partitions of a table at a given point in time are loaded from the source database for replication to the target database. As such, the data on the target database system will reflect the state of the source database system at the time the load as executed. Although the transactional cost per row is low due to efficient bulk apply, a lot of data is transferred. Additionally, the impact on the source database is high regardless of the number of changes since all the data of a given partition or table is loaded rather than only the changed records.

Conventionally, the update path (e.g. incremental or bulk upload) is chosen manually by a user. For example, if the latency while updating the data incrementally becomes too high, the user can choose to use a bulk load update. However, the embodiments described herein provide improvements in the operation of a database replication system by enabling the database replication system to automatically and dynamically select the update path for data synchronization based on various performance characteristics observed at runtime. Such performance characteristics can include, but are not limited to, the transactional cost for different change types (e.g. insert vs. update vs. delete), the number of change records, the concurrent workloads of the system (e.g. workload manager activities, locking, etc.). Thus, embodiments of the enhanced data synchronization system dynamically switch between the log-stream-based incremental update path and the bulk-load-based snapshot synchronization path on a per-table or per-table-partition basis.

FIG. 1 is a block diagram of one embodiment of an example data processing system 100 in which the enhanced data synchronization system 150 can operate. The data processing system 100 includes the enhanced data synchronization system 150, a first computer system 101 (also referred to as a source database system or transactional engine) and a second computer system 121 (also referred to as a target database system, analytical engine or accelerator engine). The first computer system 101 can support various databases including, but not limited to, IBM® DB2®, Microsoft SQL Server, Oracle, Sybase, IBM System z®, etc. Similarly, the second computer system 121 can support various databases including, but not limited to, IBM® DB2®, Oracle, Sybase, My SQL, Netezza®, etc.

The first computer system 101 includes processor 102, memory 103, I/O circuitry 104, network interface 105 and storage 107 coupled together by bus 106. The processor 102 can be implemented using one or more processors (e.g., microprocessors). The memory 103 can include any one or combination of volatile memory elements (e.g., random access memory (RAM, such as dynamic access memory (DRAM), a static random access memory (SRAM), synchronous DRAM (SDRAM), etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Memory 103 in combination with storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 103 may include one or more separate programs, e.g., database management system DBMS1 109, each of which comprises an ordered listing of executable instructions for implementing logical functions. The software in memory 103 also typically includes a suitable operating system (OS) 108. The OS 108 controls the execution of other computer programs. The DBMS1 109 can have access to and/or control of a first dataset 112 stored on storage device 107. The first dataset 112 may, for example, comprise transaction data stored in one or more tables 114. Each table 114 includes one or more partitions 116.

The second computer system 121 includes processor 122, memory 123, I/O circuitry 124, storage 127 and network interface 125 coupled together by bus 126. The processor 122 can be implemented using one or more processors (e.g., microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with storage device 127 of the second computer system 121 may be used for local data and instruction storage. Storage device 127 includes one or more persistent storage devices and media controlled by I/O circuitry 124. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs, e.g., database management system DBMS2 129, each of which comprises an ordered listing of executable instructions for implementing logical functions. The software in memory 123 also typically includes a suitable OS 128. The OS 128 essentially controls the execution of other computer programs. The DBMS2 119 can have or control access to a second dataset 132 stored on storage device 127 of the second computer system 121. The second dataset 132 may, for example, comprise transaction data stored in one or more tables 134. Each table 134 includes one or more partitions 136.

The second dataset 132 may be obtained by replicating or copying a source dataset such as the first dataset 112 from the first computer system 101 to the second computer system 121. The second dataset 132 may comprise at least part of the attributes of the first dataset 112. For example, the second dataset 132 may comprise for a given attribute more attribute values than attribute values of the given attribute in the first dataset 112.

The second computer system 121 may thus be a target of data of the first computer system 101 in that data of the first computer system 101 may be replicated or copied into the second computer system 121. FIG. 1 depicts for exemplification purpose only one target computer system (the second computer system 121). However, the first computer system 101 may be connected to multiple target computer systems such as the second computer system 121. Each of the target computer system may comprise a respective DBMS.

To facilitate the efficient replication of data from the source database system 101 to the target database system 121, the enhanced data synchronization system 150 is configured to dynamically select an update path during runtime based on various performance characteristics. In particular, the enhanced data synchronization system 150 reads a stream of change log records from the source database system 101 to identify to which table or table partition the change record belongs. The change log records can be received, for example, from the recovery log 104 stored in memory 103 of source database system 101.

Based on the change log records, the enhanced data synchronization system 150 generates statistics over these in-flight changes, e.g. a streaming-based histogram counting the number of pending changes (row insertions, deletions, updates) per table partition. While executing one of the synchronization paths (e.g. bulk update or incremental), the enhanced data synchronization system 150 observes the apply performance of applying the changes and generates performance statistics per table. Additionally, the enhanced data synchronization system 150 estimates the processing or transactional costs for incrementally applying the set of buffered in-flight changes and compares those estimated costs with estimated processing costs for reloading the affected partitions using a bulk load update path. Based on this comparison, the enhanced data synchronization system 150 identifies partitions where the incremental update path is too slow to catch up with the change rate produced by the source database system 101. The enhanced data synchronization system 150 triggers a reload of the identified affected partitions to catch up changes with the current data snapshot through the bulk load update path. The enhanced data synchronization system 150 can then discard old buffered in-flight changes and update the log sequence number (LRSN) of the last applied log record to the last LRSN that was valid in the snapshot to be reloaded. The enhanced data synchronization system 150 then continues log reading from this updated LRSN. Additional details regarding operation of the enhanced data synchronization system 150 are discussed below.

The first computer system 101, the enhanced data synchronization system 150, and the second computer system 121 can be implemented as independent computer hardware platforms communicating through a high-speed connection 142 or a network 141 via network interfaces 105, 125, as depicted in FIG. 1. The network 141 may for example comprise a local area network (LAN), a general wide area network (WAN), and/or a public network (e.g., the Internet). Each computer system 101 and 121 is responsible for managing its own copies of the data.

Although shown in FIG. 1 as separate systems, the first computer system 101, the enhanced data synchronization system 150, and/or the second computer system 121 can be implemented in a single system, in other embodiments, e.g., sharing a same memory and processor hardware, while each of the first and second computer systems is associated with a respective DBMS and datasets, e.g., the two DBMSs may be stored in the shared memory. In another example, the two database management systems DBMS1 and DBMS2 may form part of a single DBMS that enables communications and method performed by DBMS1 and DBMS2 as described herein. For example, one or more functions of the enhanced data synchronization system 150 described herein can be implemented by the computer system 101 and/or the computer system 121, in some embodiments. In other embodiments, one or more functions of the enhanced data synchronization system 150 can be implemented in an access server communicatively coupled to the first computer system 101 and the second computer system 121. Additionally, the data processing system 100 may be a distributed system hosted as a hybrid cloud, consisting of the first computer system 101, the enhanced data synchronization system 150, and one or more second computer systems 121.

Figure 2:
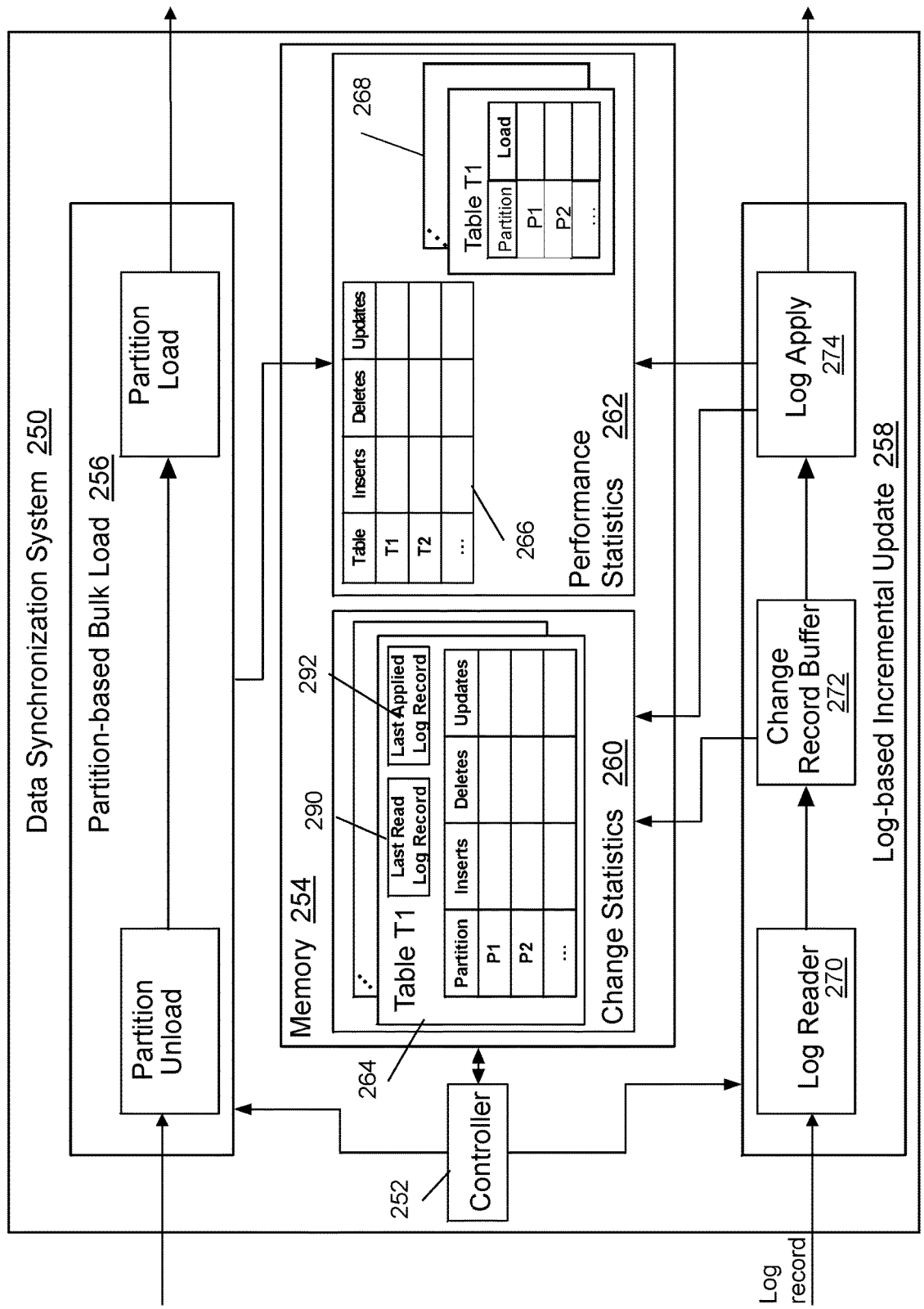
FIG. 2 is a block diagram depicting one embodiment of data flow through an example enhanced data synchronization system.

FIG. 2 is a block diagram depicting one embodiment of data flow through an example enhanced data synchronization system 250. The enhanced data synchronization system 250 is configured to dynamically select one of a log-based incremental update path 258 and a partition-based bulk load update path 156 to improve performance of a data processing system, such as data processing system 100. As part of managing the dynamic switching between the different data synchronization techniques, the enhanced data synchronization system 250 maintains statistics of change records and performance statistics of the different data synchronization paths for use in dynamically selecting the data synchronization path.

The enhanced data synchronization system 250 receives log records from a source database system, such as from a recovery log 140, as discussed above. Each log record includes information such as, but not limited to, an LRSN, timestamp, table ID, partition ID, and attribute changes for the corresponding record. A controller 252 is configured to implement a log reader 270 configured to extract, from each received log record, the corresponding partition ID, table ID, and type of change record (i.e. insert, update, or delete). The partition ID and the table ID can be read directly from the log record. The type of record can be determined, in some embodiments, by a bit comparison of a predetermined byte in the record. For example, a byte value of 01000000 in the predetermined byte can indicate an insert operation, a byte value of 00100000 can indicate a delete operation, and a byte value of 0000001 can indicate an update operation in some embodiments. It is to be understood that other byte values can be used in other embodiments.

The controller 252 stores the extracted values in a set of tables 264 stored as part of change statistics 260 on memory 254. Each table 264 is identified by a table ID and stores change data (e.g. inserts, deletes, updates) for its set of partitions. The change statistics 260 also includes a last read log record 290 and a last applied log record 292 for each table 264. During the log-based incremental update path 258, the data extracted by the log reader 270 is temporarily held in a change record buffer 272 and the controller 252 updates the change statistics 260 from the data in the change record buffer 272. The controller 252 then implements a log apply function 274 that applies the changes to the target database in the target database system. In particular, the log apply function 274 looks up the corresponding table using the extracted table ID, looks up the corresponding partition using the extracted partition ID, and then subtracts the amount of changed rows from a corresponding counter.

As part of the log apply function 274 of the log-based incremental update path 258 as well as part of the partition-based bulk load update path 256, the controller 252 maintains performance statistics 262 which are stored on memory 254. For example, in this embodiment, the performance statistics 262 include a table 266 for maintaining incremental update performance metrics and a set of tables 268 for maintaining bulk load update performance metrics. Each table 268 is identified by a table ID and stores performance metrics for its set of partitions. The incremental update performance metrics include an average time to insert a row (ti), an average time to delete a row (td), and an average time to update a row (tu). The average time to update a row can be based on a combination of the average time to delete a row and the average time to insert a row, in some embodiments. The bulk load update performance metrics include an average time a bulk load takes to modify (e.g. insert, update, or delete) all rows in a partition p (tl_p), where p indicates a given partition of one or more partitions within a table. Thus, a separate tl_p can be collected for each partition in a table, in some embodiments.

The average time to insert a row, the average time to delete a row, and the average time to update a row, are obtained during the log-based incremental update path 258. In particular, the controller 252 collects the apply time for delete and insert queries on a per table basis. That is, the time an insert operation takes (tapplyi) and the time a delete operation takes (tapplyd) for each table is collected. The collected apply times (tapplyi and tapplyd) are divided by the number of modifications done for each operation type. Thus, ti is equal to tapplyi divided by the number of inserted rows and td is equal to tapplyd divided by the number of deleted rows. In some embodiments, the average time to update a row is determined by dividing the sum of the apply times (tapplyi and tapplyd) by the sum of the number of modifications done for each operation type. Thus, in some such embodiments, tu is equal to (tapplyi+tapplyd) divided by (the number of inserted rows+the number of deleted rows). In other embodiments, update times are tracked separately rather than calculating the average update times based on tracked times for insert and delete operations. For example, in some such embodiments, an update is processed in-place rather than being split into an insert operation and a delete operation. In some embodiments, after each apply operation, the performance statistics 262 are updated. In other embodiments, a rolling window of a predetermined size of collected apply times can be used in making the above calculations and updating the performance statistics 262 to make the calculations more robust against outlier data.

The average time a bulk load takes to modify all rows in a partition p (tl_p) is collected as part of the partition-based bulk load update path 256. In particular, the load runtime and the amount of applied data changes are captured. For example, in some embodiments, the load runtime and the amount of applied data changes can be captured via real-time statistics that are exchanged between the source database system and the target database system. The average time to modify all rows in a partition p (tl_p) is calculated per table partition, in some embodiments. In other embodiments, a single average load time per table over all partitions in the table can be calculated or collected.

The controller 252 uses the collected performance statistics to dynamically select the update path to use. In particular, the controller 252 determines the number of changes to apply. For example, the controller 252 can determine for each table the list of affected table partitions that have pending changes inside the change record buffer 272 using the LRSN of the last applied log record 292 as a base line to which the LRSNs of pending changes can be compared. The controller 252 can then estimate an apply time for each of the alternative data update paths 256 and 258. For example, the apply time for each table using the incremental update path 258 can be estimated based on the number of rows to be inserted for the respective table times the average time to insert a row (ti) plus the number of rows to be deleted for the respective table times the average time to delete a row (ti). Thus, the apply time (tapply) for each table using the incremental update path 258 can be expressed as tapply=(number of inserted rows for table*ti)+(number of deleted rows for table*td).

The load time for each table using the bulk load update path 256 can be based on the time to load the total amount of rows for all affected table partitions. For example, there may be partitions that do not have pending changes and, thus, do not need to be reloaded. As such, the partitions without any pending changes can be excluded from the calculation of the load time for a given table (tload) using the bulk load update path 256. The affected partitions having rows with pending changes can be identified from the change record buffer 272 and/or the table 264. Thus, in some embodiments, the load time for a given table (tload) can be expressed as tload=sum of all respective tl_p for affected partitions of the given table. After computing the tapply and the tload for a given table, the controller 252 selects an update path based on a comparison of the tapply and tload for the given table. In particular, in some embodiments, if tapply is greater than tload, then the controller 252 selects to use the partition-based bulk load update path 256. Likewise, in such embodiments, if tapply is less than tload, then the controller 252 selects the log-based incremental update path 258. In some such embodiments, if tapply is equal to tload then the controller 252 selects the log-based incremental update path 258. In other such embodiments, if tapply is equal to tload then the controller 252 selects the bulk load update path 256.

Additionally, in some embodiments, the difference between tload and tapply must be greater than a predetermined threshold to prevent too frequent switching between the update paths. Furthermore, in some embodiments, a default update path, such as the incremental update path 258 can be selected and the update path is switched to the bulk load update path 256 if tapply exceeds tload by a predetermined threshold amount. After updating the target database system, the old changes are discarded and the pipeline of changes is flushed and log reading continues at the updated LRSN, as discussed above.

Thus, by dynamically switching between the incremental update path 258 and the bulk update path 256 based on performance characteristics observed at runtime, the enhanced data synchronization system 250 improves operation of a data processing system during replication of data from a source database to a target database. In particular, the embodiments described herein enable the enhanced data synchronization system 250 to select the path that will provide the best performance for a given set of changes to a table/partition.

Figure 3:
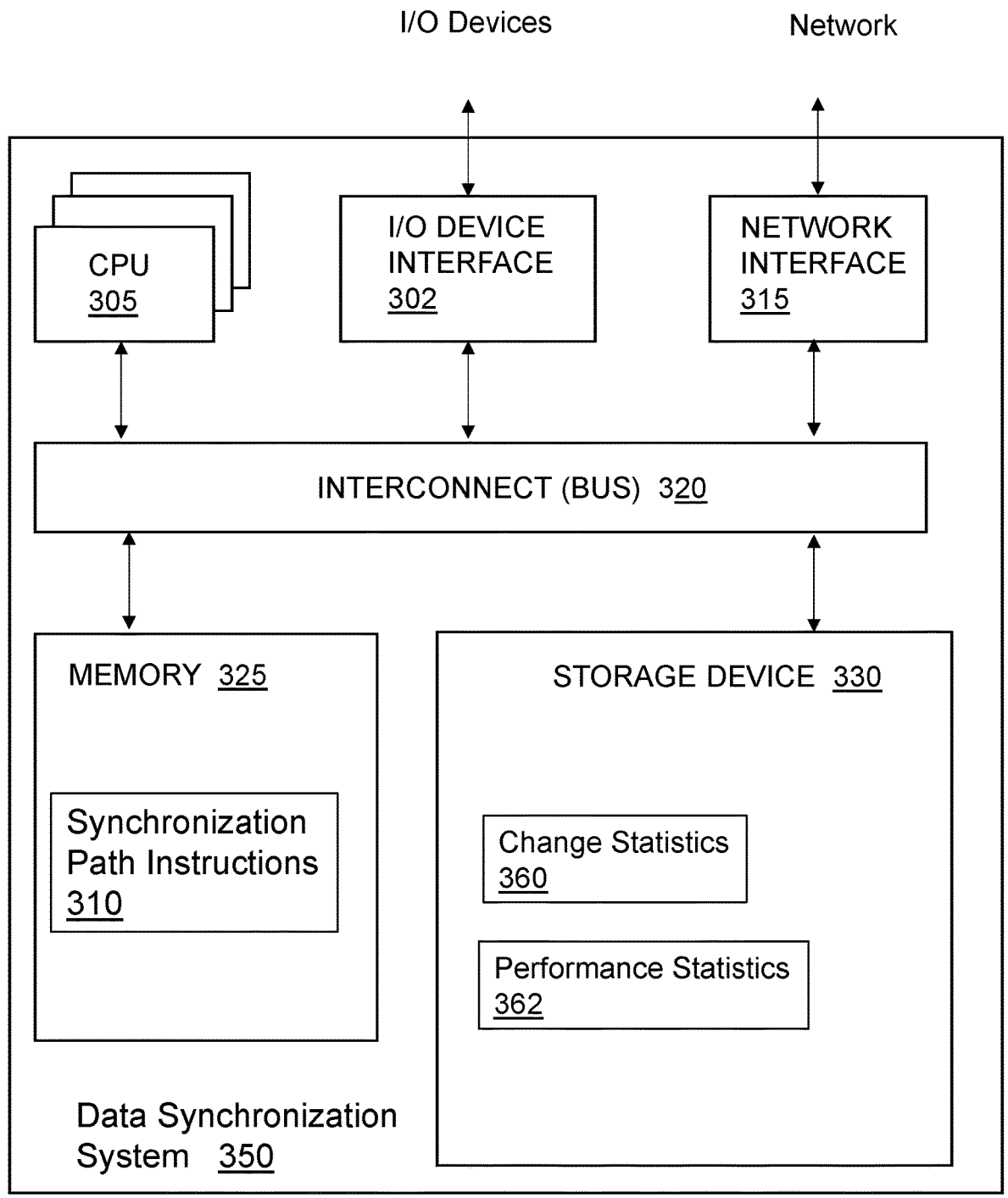
FIG. 3 is a block diagram of one embodiment of an example data synchronization system.

FIG. 3 is a block diagram of one embodiment of an example data synchronization system 350. In the example shown in FIG. 3, the data synchronization system 350 includes a memory 325, storage 330, an interconnect (e.g., BUS) 320, one or more processors 305 (also referred to as CPU 305 herein), an I/O device interface 302, and a network interface 315. It is to be understood that the data synchronization system 350 is provided by way of example only and that the data synchronization system 350 can be implemented differently in other embodiments. For example, in other embodiments, some of the components shown in FIG. 3 can be omitted and/or other components can be included.

Each CPU 305 retrieves and executes programming instructions stored in the memory 325 and/or storage 330. The interconnect 320 is used to move data, such as programming instructions, between the CPU 305, I/O device interface 302, storage 330, network interface 315, and memory 325. The interconnect 320 can be implemented using one or more busses. The CPUs 305 can be a single CPU, multiple CPUs, or a single CPU having multiple processing cores in various embodiments. In some embodiments, a processor 305 can be a digital signal processor (DSP). Memory 325 is generally included to be representative of a random access memory (e.g., static random access memory (SRAM), dynamic random access memory (DRAM), or Flash). The storage 330 is generally included to be representative of a non-volatile memory, such as a hard disk drive, solid state device (SSD), removable memory cards, optical storage, or flash memory devices. In an alternative embodiment, the storage 330 can be replaced by storage area-network (SAN) devices, the cloud, or other devices connected to the data synchronization system 350 via the I/O device interface 302 or via a communication network coupled to the network interface 315.

In some embodiments, the memory 325 stores synchronization path instructions 310 and the storage 330 stores change statistics 360 and performance statistics 362. However, in various embodiments, the synchronization path instructions 310, the change statistics 360, and the performance statistics 362 are stored partially in memory 325 and partially in storage 330, or they are stored entirely in memory 325 or entirely in storage 330, or they are accessed over a network via the network interface 315. As discussed above, the change statistics 360 include respective change data (e.g. inserts, deletes, updates) for the partitions of each table in the source database received via log records. The change statistics 360 also include a last read log record and a last applied log record for each table, as discussed above. The performance statistics 362 include computed values for an average time to insert a row (ti), an average time to delete a row (td), an average time to update a row (tu), and an average time a load takes to modify (e.g. insert, update, or delete) all rows in a partition p (tl_p), as discussed above. Additionally, as discussed above, the change statistics 360 and/or the performance statistics 362 can be stored in a database or memory device accessed via the network interface 315 rather than being locally attached or integrated with the data synchronization system 350.

The data synchronization system 350 tracks the change statistics 360/performance statistics 362 and dynamically selects an update path based on the performance statistics 362, as discussed above. For example, the CPU 305 can execute the synchronization path instructions 310 to implement one or more of the functions of controller 252 and data synchronization system 250 discussed above to dynamically select the update path for a given table or partition. Further details regarding the operation of the data synchronization system executing synchronization path instructions 310 are discussed in more detail below with respect to FIG. 4. In addition, in some embodiments, the data synchronization system 350 can be implemented within a cloud computer system or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers.

Figure 4:
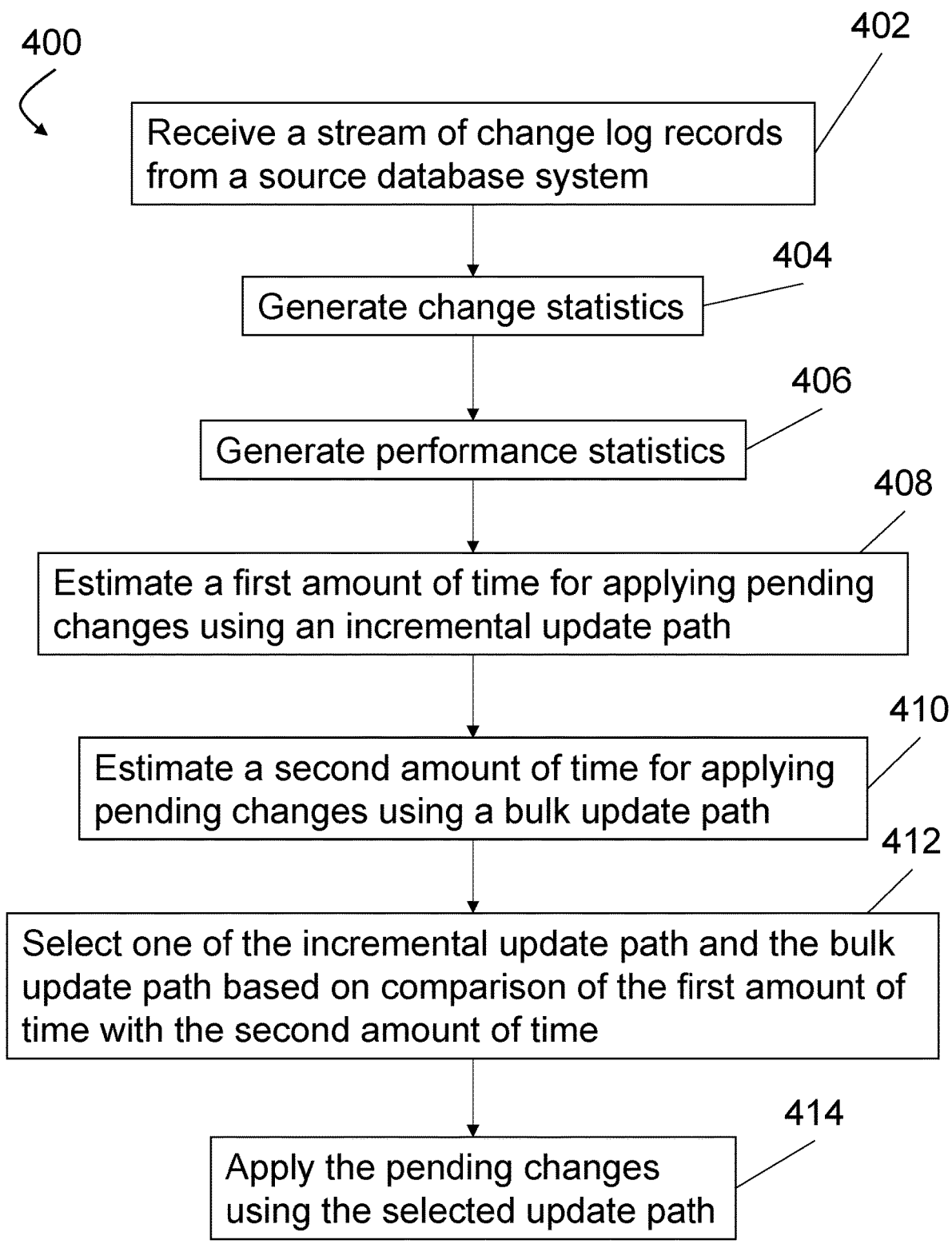
FIG. 4 is a flow chart depicting one embodiment of an example method of dynamically selecting an update path.

FIG. 4 is a flow chart depicting one embodiment of an example method 400 of dynamically selecting an update path. The method 400 can be implemented by a data synchronization system, such as data synchronization system 250 or 350 described above. For example, the method 400 can be implemented by a CPU, such as CPU 305 in data synchronization system 350, executing instructions, such as synchronization path instructions 310. It is to be understood that the order of actions in example method 400 is provided for purposes of explanation and that the method can be performed in a different order in other embodiments. Similarly, it is to be understood that some actions can be omitted, or additional actions can be included in other embodiments.

At 402, a stream of change log records from a source database system are received. As discussed above, each of the change log records can include a log sequence number (LRSN), a timestamp, a table ID, a partition ID, and attribute changes for the corresponding record. At 404, change statistics based on a number of pending changes per table partition according to the change log records are generated, as discussed above. At 406, performance statistics are generated by monitoring application of changes to the target database system using the incremental update path and monitoring application of changes to the target database using the bulk update path. In other embodiments, the performance statistics can be generated by a separate system and supplied to the data synchronization system.

At 408, a first amount of time for applying the pending changes to a target database system using an incremental update path is estimated based on the performance statistics, as discussed above. At 410, a second amount of time for applying the pending changes to the target database using a bulk update path is estimated based on the performance statistics, as discussed above. At 412, one of the incremental update path and the bulk update path is dynamically selected, based on comparison of the first amount of time with the second amount of time, for applying the pending changes to the target database system, as discussed above. For example, in some embodiments, the incremental update path is selected if the first amount of time is equal to or less than the second amount of time and the bulk update path is selected if the second of amount of time is less than the first amount of time. In other embodiments, the bulk update path is selected if the second of amount of time is equal to or less than the first amount of time and the incremental update path is selected if the first amount of time is less than the second amount of time. At 414, the pending changes are applied to the target database system using the selected update path.

Furthermore, in some embodiments, the data synchronization system identifies, for each received change log record, a table of a plurality of tables in the source database to which the change applies based on data in the corresponding change log record. In such embodiments, dynamically selecting the update path includes dynamically selecting one of the incremental update path and the bulk update path for each of the plurality of tables in the database. Similarly, the pending changes are applied to the target database system using the corresponding selected update path for each of the plurality of tables.

Thus, as described above, method 400 improves the efficiency and operation of a data synchronization system by enabling automatic and dynamic selection of an update path for applying changes from the source database system to the target database system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, as discussed above, the functionality of the enhanced data synchronization system can be implemented in a cloud computing environment. However, it is to be understood that although this disclosure includes a detailed description on cloud computing, implementation of the teachings recited herein are not limited to a cloud computing environment. Rather, the embodiments discussed herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
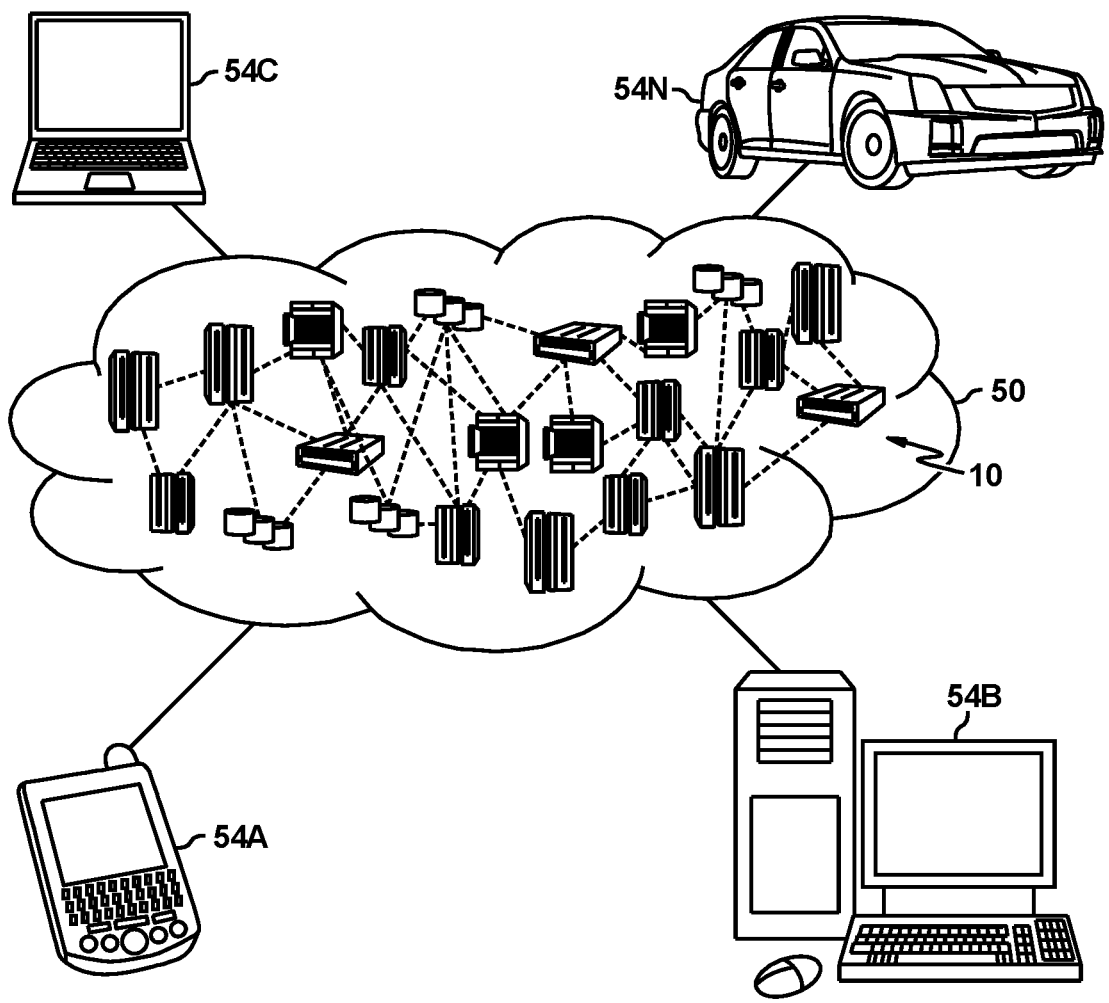
FIG. 5 depicts one embodiment of a cloud computing environment.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer device 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
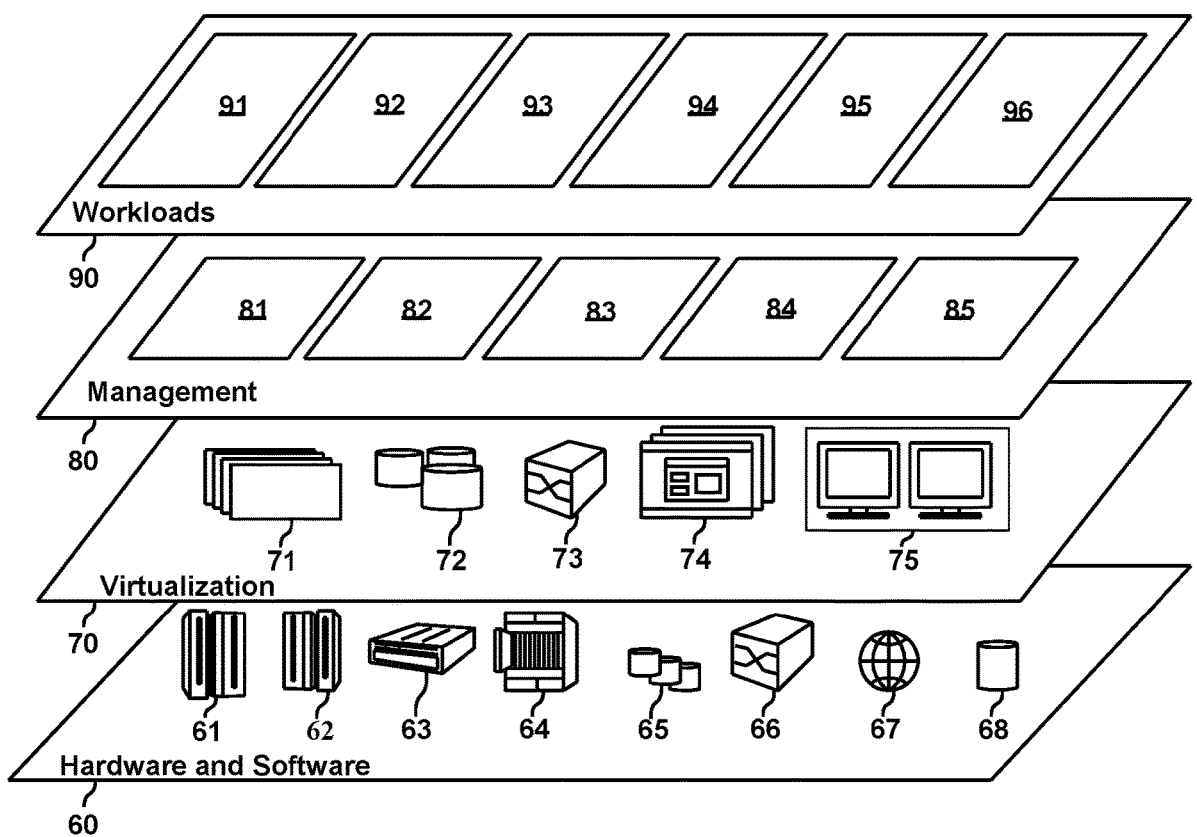
FIG. 6 depicts one embodiment of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data synchronization 96.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   receiving a stream of change log records from a source database system;
   generating change statistics based on a number of pending changes per table partition according to the change log records;
   estimating, based on performance statistics, a first amount of time for applying the pending changes to a target database system using an incremental update path;
   estimating, based on the performance statistics, a second amount of time for applying the pending changes to the target database using a bulk update path;
   dynamically selecting, based on comparison of the first amount of time with the second amount of time, one of the incremental update path and the bulk update path for applying the pending changes to the target database system; and
   applying the pending changes to the target database system using the selected update path.

2. The method of claim 1, wherein each change log record comprises a log sequence number (LRSN), a timestamp, a table ID, a partition ID, and attribute changes for the corresponding record.

3. The method of claim 2, wherein applying the pending changes comprises applying the pending changes via the bulk update path;
   wherein the method further comprises:
   discarding buffered changes for the incremental update path;
   updating a value in the change statistics for a last applied log record with the LRSN of the last valid log record applied in the bulk update path; and
   continuing log reading from the updated LRSN of the last applied log record.

4. The method of claim 1, further comprising:
   generating the performance statistics by monitoring application of changes to the target database system using the incremental update path and monitoring application of changes to the target database using the bulk update path.

5. The method of claim 1, wherein dynamically selecting comprises dynamically selecting the incremental update path if the first amount of time is equal to or less than the second amount of time.

6. The method of claim 1, wherein dynamically selecting comprises selecting the bulk update path if the second of amount of time is equal to or less than the first amount of time.

7. The method of claim 1, further comprising:
   for each change log record, identifying a table of a plurality of tables in the target database system to which the change applies based on data in the corresponding change log record; and
   wherein dynamically selecting comprises dynamically selecting for each of the plurality of tables in the database, one of the incremental update path and the bulk update path; and
   wherein applying the pending changes comprises applying the pending changes to the target database system using the corresponding selected update path for each of the plurality of tables.

8. A system comprising:
   a source database system comprising a storage device configured to store a first dataset;
   a target database system comprising a storage device configured to store a second dataset; and
   a data synchronization system communicatively coupled to the source database system and the target database system, wherein the data synchronization system comprises a processor configured to:
   receive a stream of change log records from the source database system;
   generate change statistics based on a number of pending changes per table partition according to the change log records;
   estimate, based on performance statistics, a first amount of time for applying the pending changes to the target database system using an incremental update path;
   estimate, based on the performance statistics, a second amount of time for applying the pending changes to the target database using a bulk update path;

dynamically select, based on comparison of the first amount of time with the second amount of time, one of the incremental update path and the bulk update path for applying the pending changes to the target database system; and apply the pending changes to the target database system using the selected update path.

9. The system of claim 8, wherein each change log record comprises a log sequence number (LRSN), a timestamp, a table ID, a partition ID, and attribute changes for the corresponding record.

10. The system of claim 9, wherein the processor is configured to apply the pending changes via the bulk update path; and wherein the processor is further configured to:
discard buffered changes for the incremental update path;
update a value in the change statistics for a last applied log record with the LRSN of the last valid log record applied in the bulk update path; and
continue log reading from the updated LRSN of the last applied log record.

11. The system of claim 8, wherein the processor is further configured to:
generate the performance statistics by monitoring application of changes to the target database system using the incremental update path and monitoring application of changes to the target database using the bulk update path.

12. The system of claim 8, wherein the processor is configured to dynamically select the incremental update path if the first amount of time is equal to or less than the second amount of time.

13. The system of claim 8, wherein the processor is configured to dynamically select the bulk update path if the second of amount of time is equal to or less than the first amount of time.

14. The system of claim 8, wherein the processor is further configured to:
for each change log record, identify a table of a plurality of tables in the target database system to which the change applies based on data in the corresponding change log record; and
dynamically select for each of the plurality of tables in the database, one of the incremental update path and the bulk update path; and
apply the pending changes to the target database system using the corresponding selected update path for each of the plurality of tables.

15. A computer program product comprising a computer readable storage medium having a computer readable program stored therein, wherein the computer readable program, when executed by a processor, causes the processor to:
receive a stream of change log records from a source database system;
generate change statistics based on a number of pending changes per table partition according to the change log records;
estimate, based on performance statistics, a first amount of time for applying the pending changes to a target database system using an incremental update path;
estimate, based on the performance statistics, a second amount of time for applying the pending changes to the target database using a bulk update path;
dynamically select, based on comparison of the first amount of time with the second amount of time, one of the incremental update path and the bulk update path for applying the pending changes to the target database system; and
apply the pending changes to the target database system using the selected update path.

16. The computer program product of claim 15, wherein each change log record comprises a log sequence number (LRSN), a timestamp, a table ID, a partition ID, and attribute changes for the corresponding record.

17. The computer program product of claim 16, wherein the computer readable program is further configured to cause the processor to apply the pending changes via the bulk update path;
discard buffered changes for the incremental update path after applying the pending changes via the bulk update path;
update a value in the change statistics for a last applied log record with the LRSN of the last valid log record applied in the bulk update path; and
continue log reading from the updated LRSN of the last applied log record.

18. The computer program product of claim 15, wherein the computer readable program is further configured to cause the processor to:
generate the performance statistics by monitoring application of changes to the target database system using the incremental update path and monitoring application of changes to the target database using the bulk update path.

19. The computer program product of claim 15, wherein the computer readable program is further configured to cause the processor to dynamically select the incremental update path if the first amount of time is equal to or less than the second amount of time.

20. The computer program product of claim 15, wherein the computer readable program is further configured to cause the processor to:
for each change log record, identify a table of a plurality of tables in the target database system to which the change applies based on data in the corresponding change log record; and
dynamically select for each of the plurality of tables in the database, one of the incremental update path and the bulk update path; and
apply the pending changes to the target database system using the corresponding selected update path for each of the plurality of tables.

\* \* \* \* \*